(12) United States Patent
Wyne et al.

(10) Patent No.: US 10,317,265 B1
(45) Date of Patent: Jun. 11, 2019

(54) TRASH RECEPTACLE GRANULE DISPENSER

(71) Applicants: Robert Wyne, Ocean City, MD (US); Rosemary Corbey, Ocean City, MD (US)

(72) Inventors: Robert Wyne, Ocean City, MD (US); Rosemary Corbey, Ocean City, MD (US)

(73) Assignee: Pioneer Concepts, LLC, Ocean City, MD (US)

( * ) Notice: Subject to any disclaimer, the term of this patent is extended or adjusted under 35 U.S.C. 154(b) by 190 days.

(21) Appl. No.: 15/616,863

(22) Filed: Jun. 7, 2017

Related U.S. Application Data

(63) Continuation-in-part of application No. 15/476,964, filed on Mar. 31, 2017.

(51) Int. Cl.
| | |
|---|---|
| *B65F 7/00* | (2006.01) |
| *B65D 83/06* | (2006.01) |
| *G01F 11/26* | (2006.01) |
| *G01F 15/18* | (2006.01) |
| *B65F 1/14* | (2006.01) |
| *B65D 83/04* | (2006.01) |
| *A47F 1/035* | (2006.01) |

(52) U.S. Cl.
CPC ........ *G01F 11/261* (2013.01); *B65D 83/0427* (2013.01); *B65D 83/06* (2013.01); *B65F 1/14* (2013.01); *B65F 7/00* (2013.01); *G01F 11/268* (2013.01); *G01F 15/185* (2013.01); *A47F 1/035* (2013.01); *B65F 2210/129* (2013.01)

(58) Field of Classification Search
CPC .. A47F 1/03; A47F 1/035; A61L 11/00; A61L 9/12; A61L 9/012; B65D 83/0427; B65D 83/0454; B65D 83/06; B65D 51/243; B65F 7/00; B65F 7/005; B65F 2210/129; G01F 11/261; G01F 11/268
USPC .......... 221/263–265; 222/166, 169, 170, 537
See application file for complete search history.

(56) References Cited

U.S. PATENT DOCUMENTS

| | | |
|---|---|---|
| 125,860 A | 4/1872 | Voss |
| 503,212 A | 8/1893 | Macleod |
| 508,325 A | 11/1893 | Lewus |
| 530,057 A | 11/1894 | salberg |
| 577,747 A | 2/1897 | hansen |
| 815,496 A | 3/1906 | Wangenheim |
| 1,323,918 A | 12/1919 | Seraphine |
| 2,802,590 A | 8/1957 | Tupper |
| 3,840,145 A | 10/1974 | Almanza |

(Continued)

*Primary Examiner* — Mollie Impink
(74) *Attorney, Agent, or Firm* — QuickPatents, LLC; Kevin Prince

(57) ABSTRACT

A device dispenses scented granules into a trash receptacle that has a least a side wall. An enclosure for holding the scented granules therein has at least a top end, a bottom end, a front wall, a rear wall, and includes at least one discharge opening in the rear wall and a refill opening proximate the front wall at the top end thereof. At least one conduit standoff projects away from each discharge opening and is adapted for fixing with the side wall of the trash receptacle. A portion control structure is fixed within the enclosure proximate the top end and cooperative therewith to segregate a portion of the scented granules when the enclosure is in an inverted orientation, and to deliver the segregated scented granules through a delivery conduit to the at least one discharge opening and conduit standoff when the enclosure is in an upright orientation.

7 Claims, 5 Drawing Sheets

(56) References Cited

U.S. PATENT DOCUMENTS

| | | |
|---|---|---|
| 4,235,849 A | 11/1980 | Handeland |
| 5,065,886 A | 11/1991 | Sher |
| 5,535,913 A | 7/1996 | Asbach |
| 7,086,569 B2 | 8/2006 | Stravitz |
| 7,516,865 B1 | 4/2009 | Pierre |
| 7,696,711 B2 | 4/2010 | Pollack |
| 7,878,359 B1 | 2/2011 | Ko |
| 8,122,522 B2 | 2/2012 | Looft |
| 8,647,587 B2 | 2/2014 | Dunn |
| 8,690,017 B2 | 4/2014 | Dunn |
| 8,910,821 B1 | 12/2014 | Stravitz |
| 9,056,716 B1 | 6/2015 | Stravitz |
| 9,346,617 B1 | 5/2016 | Griffin |
| 9,428,335 B2 | 8/2016 | Hammond |
| 2004/0140320 A1 | 7/2004 | Stravitz |
| 2004/0265197 A1 | 12/2004 | Lin |
| 2005/0150973 A1 | 7/2005 | Brown |
| 2006/0081632 A1 | 4/2006 | Shieh |
| 2007/0125792 A1 | 6/2007 | Pollack |
| 2008/0087740 A1 | 4/2008 | Gusenoff |
| 2009/0008394 A1 | 1/2009 | Colarusso |
| 2011/0099942 A1 | 5/2011 | Dunn |
| 2011/0099944 A1 | 5/2011 | Dunn |
| 2011/0104022 A1 | 5/2011 | Dunn |
| 2011/0303664 A1 | 12/2011 | Nichols |
| 2012/0234849 A1 | 9/2012 | Hughes |
| 2013/0341328 A1 | 12/2013 | Schneider |
| 2014/0027452 A1 | 1/2014 | Pan |
| 2014/0138267 A1 | 5/2014 | Pirollet |
| 2014/0183193 A1 | 7/2014 | Hammond |
| 2015/0122813 A1 | 5/2015 | El-Taher |

TRASH RECEPTACLE GRANULE DISPENSER

CROSS-REFERENCE TO RELATED APPLICATIONS

The present application is a continuation-in-part of U.S. patent application Ser. No. 15/476,964, filed on Mar. 17, 2017, and incorporated herein by reference.

STATEMENT REGARDING FEDERALLY SPONSORED RESEARCH AND DEVELOPMENT

Not Applicable.

FIELD OF THE INVENTION

This invention relates to trash receptacles, and more particularly to a scent granule dispenser for a trash receptacle.

DISCUSSION OF RELATED ART

Trash receptacles, and particularly conventional dumpsters, are notorious for producing bad odors after use for several weeks or months. Typically it is impractical to clean such trash receptacles regularly, and as a result the bad odors seem to compound over time.

Further, it is easy to forget to add scenting or cleaning agents to trash receptacles upon emptying.

Therefore, there is a need for a device that will automatically disburse a scenting agent into the trash receptacle regularly. Such a needed invention would further provide an easy means of refilling the device with the scenting agent, and would allow for the amount of scenting agent dispersed to be adjustable. Such a needed device would disperse the scenting agent upon inversion of the trash receptacle and thereby work automatically to reduce offensive odors within the trash receptacle as the trash receptacle is repeatedly emptied. The present invention accomplishes these objectives.

SUMMARY OF THE INVENTION

The present device dispenses scented granules into a trash receptacle that has a least a side wall, such as a conventional trash dumpster. An enclosure, adapted to hold the scented granules therein, has at least a top end, a bottom end, a front wall and a rear wall. The enclosure includes at least one discharge opening in the rear wall, as well as a refill opening proximate the front wall at the top end thereof. A selectively removable refill cover is adapted for sealing the refill opening.

At least one conduit standoff projects away from each discharge opening and is adapted for fixing with the side wall of the trash receptacle. Each conduit standoff is a conduit in fluid communication with the at least one discharge opening at a proximal end thereof and traversing the side wall of the trash receptacle at a distal end thereof.

A portion control structure is fixed within the enclosure proximate the top end and cooperative therewith to segregate a portion of the scented granules contained in the enclosure when the enclosure e is in an inverted orientation. The portion control structure delivers the segregated scented granules through a delivery conduit to the at least one discharge opening when in the enclosure is in an upright orientation.

As such, in use, when the trash receptacle is emptied by inverting the trash receptacle, the scented granules within the enclosure fall towards the top end of the enclosure. The portion of the granules are segregated by the portion control structure and delivered through the delivery conduit to the discharge opening traversing each conduit standoff to be dispensed within the trash receptacle upon uprighting of the trash receptacle.

In some embodiments, the bottom end of the enclosure further includes a drain opening and a selectively removable drain cover adapted for sealing the drain opening. As such, the scented granules can be emptied from the enclosure by removing the drain opening cover. Preferably the top end of the enclosure further includes a portion control volume adjustment mechanism that, in a fully extended position, increases a volume within the enclosure above the portion control structure, thereby maximizing the amount of the segregated portion of the scented granules delivered to the trash receptacle with each inversion of the enclosure.

The present invention is a device that automatically disburses scented granules into the trash receptacle regularly with each emptying of the trash receptacle. The present device further provides an easy means of refilling the device with the scented granules, and allows for the amount of scented granules dispersed to be adjustable. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
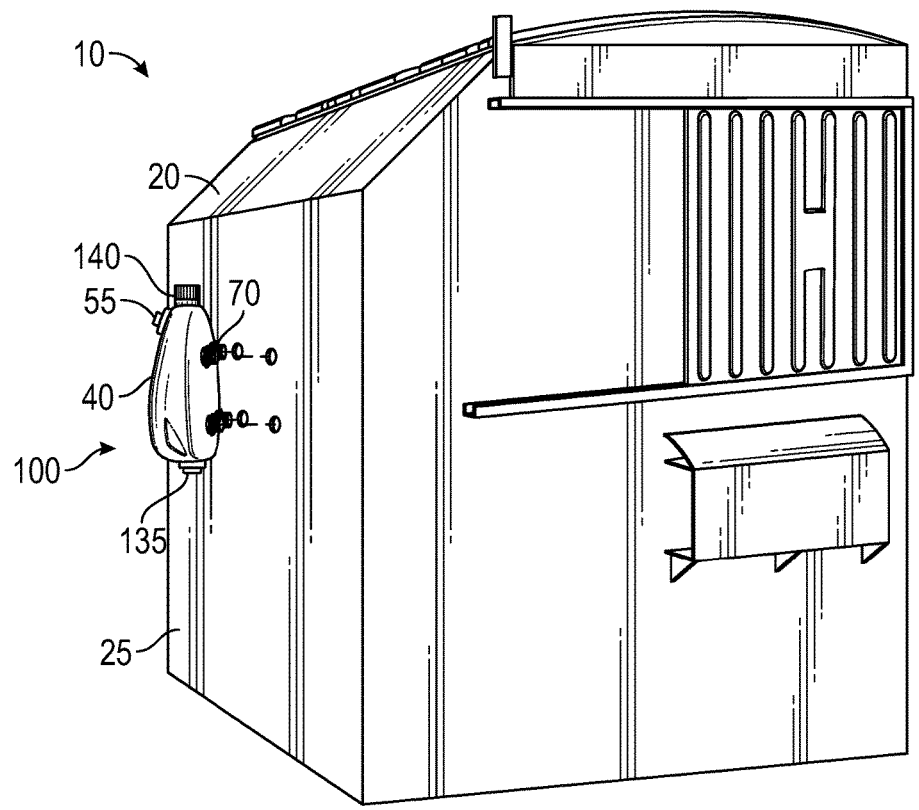
FIG. 1 is an exploded perspective view of the invention.
Figure 3:
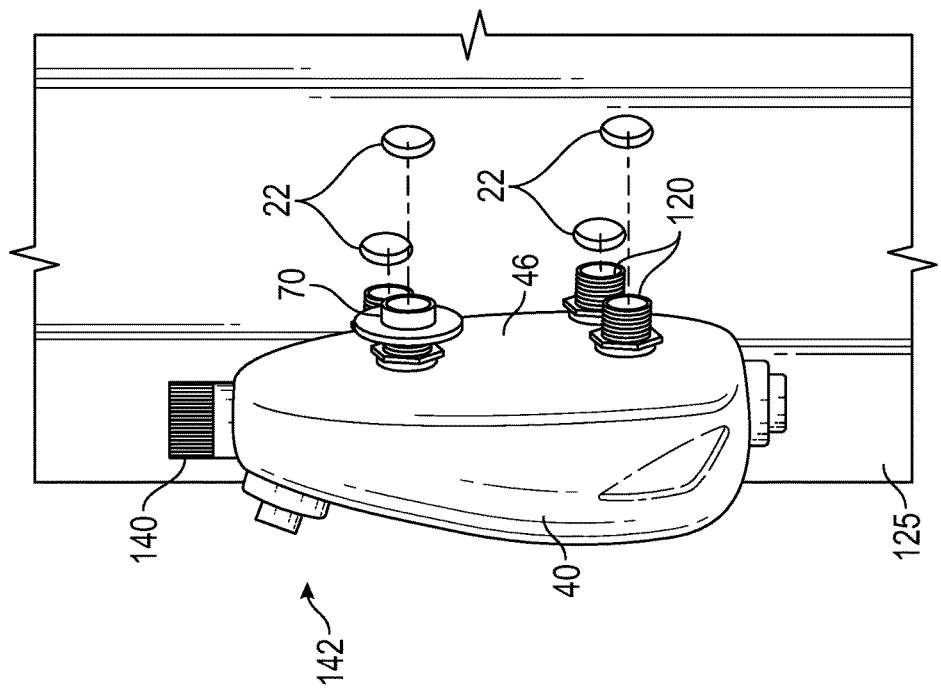
FIG. 3 is a side elevational view of the invention exploded away from a trash receptacle.
Figure 2:
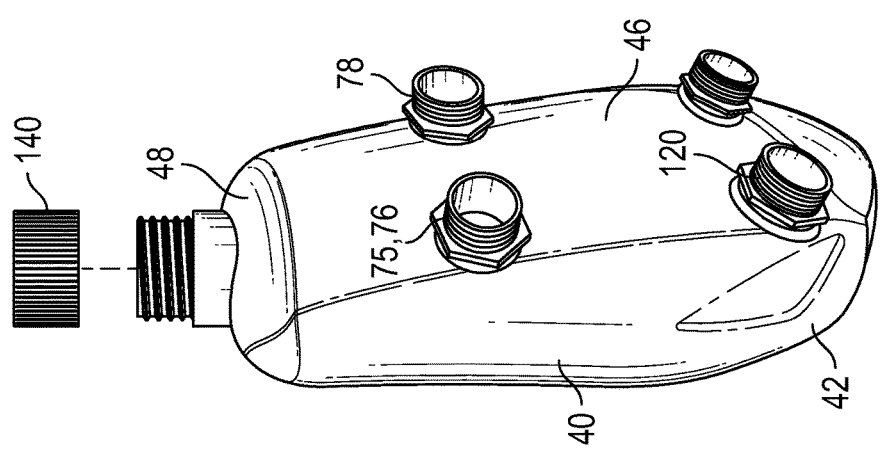
FIG. 2 is a rear perspective view of the invention.
Figure 4:
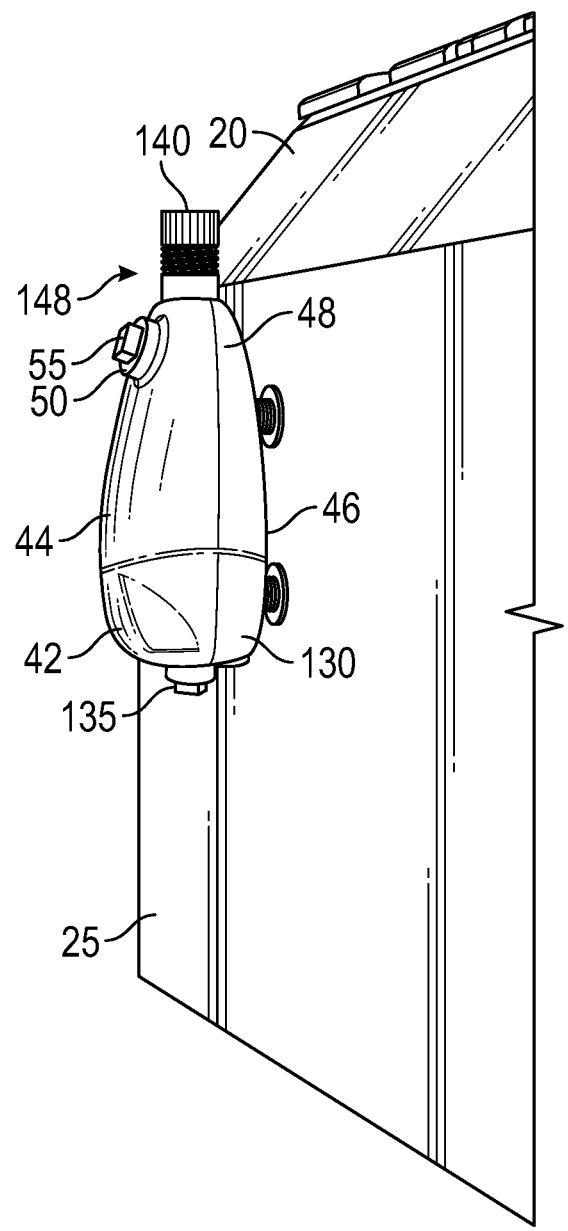
FIG. 4 is a side elevational view of the invention as mounted with the trash receptacle.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-6 illustrate a dispenser 10 for dispensing scented granules 30 into a trash receptacle 20 that has a least a side wall 25, such as a conventional trash dumpster. The trash receptacle 20 is emptied into a trash truck, or the like, by inverting the trash receptacle 20 over the trash truck.

A rigid or semi-rigid enclosure 40, adapted to hold the scented granules 30 therein, has at least a top end 48, a bottom end 42, a front wall 44 and a rear wall 46. The enclosure 40 includes at least one discharge opening 60 in the rear wall 46, as well as a refill opening 50 proximate the front wall 44 at the top end 48 thereof. A selectively removable refill cover 55 is adapted for sealing the refill opening 50 with, for example, cooperative threads on both an inside surface of the refill opening and an outside surface of the refill cover 55. The enclosure is preferably made from an injection-molded or roto-molded plastic material.

At least one conduit standoff 70 projects away from each discharge opening 60 and is adapted for fixing with the side wall 25 of the trash receptacle 20. Each conduit standoff 70 is a conduit in fluid communication with the at least one discharge opening 60 at a proximal end 72 thereof and traversing the side wall 25 of the trash receptacle 20 at a distal end 78 thereof.

Preferably each conduit standoff 70 and non-conduit standoff 120 includes threads 76 on an outside surface 75 thereof, such that the standoffs 70,120 are each fixed through an aperture 22 formed through the side wall 25 of the trash receptacle 20 and fixed thereto with at least a pair of threaded nuts 78. Each standoff 70,120 is preferably made from a rigid molded plastic material, such as PVC, ABS or the like.

Figure 5:
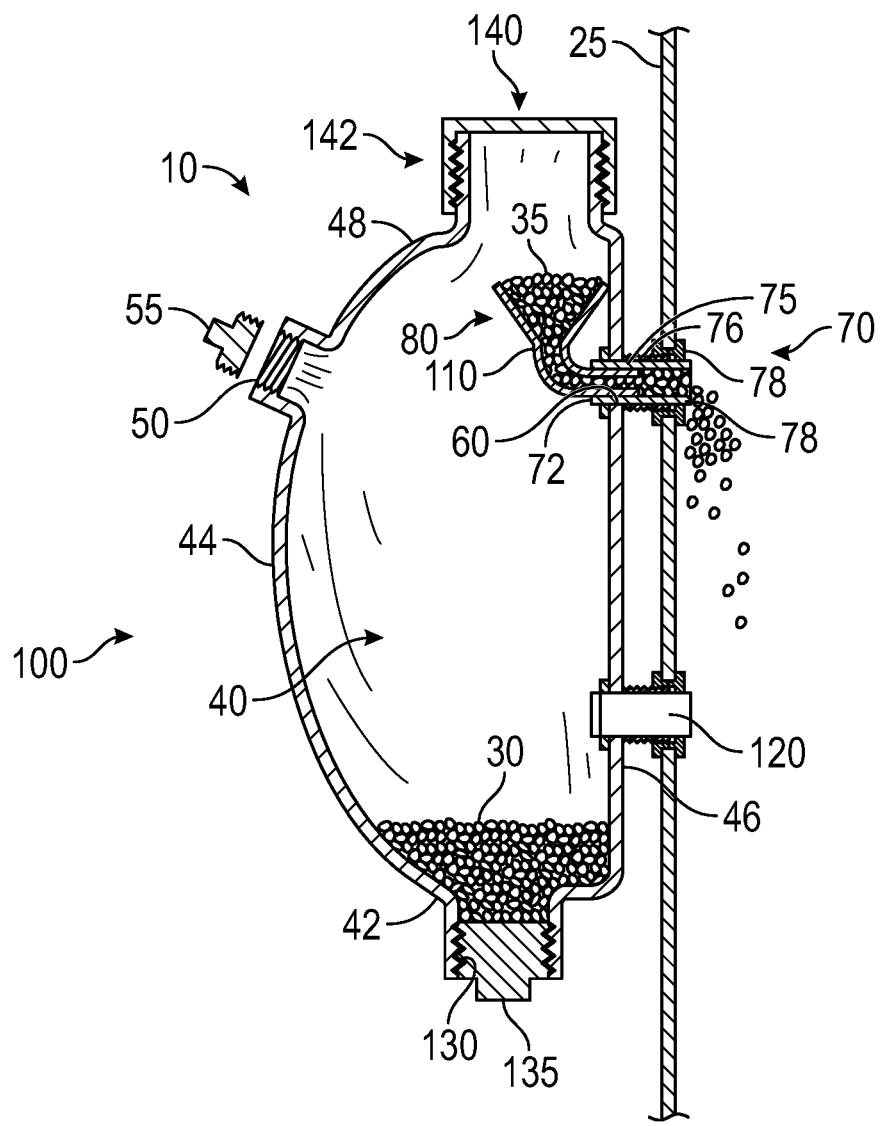
FIG. 5 is a cross-sectional view of the invention in an upright configuration.
Figure 6:
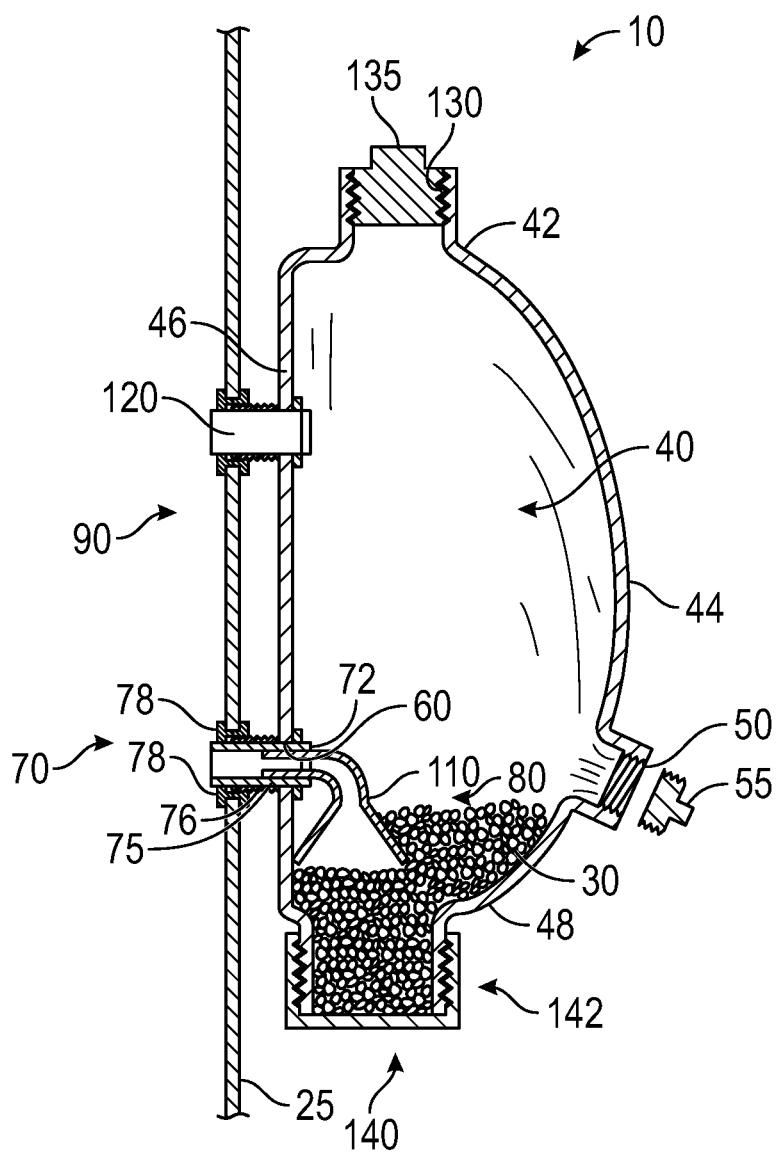
FIG. 6 is a cross-sectional view of the invention in an inverted configuration.

A portion control structure 80 is fixed within the enclosure 40 proximate the top end 48 and cooperative therewith to segregate a portion 35 of the scented granules 30 contained in the enclosure 40 when the enclosure e40 is in an inverted orientation 90 (FIG. 6). The portion control structure 80 delivers the segregated scented granules 35 through a delivery conduit 110 to the at least one discharge opening 60 when the enclosure 40 is in an upright orientation 100 (FIG. 5). Preferably the portion control structure 80 is fixed proximate the rear wall 46 of the enclosure 40, away from the refill opening 50 so as not to interfere with the refilling of the enclosure 40 with the scented granules 30. The portion control structure 80 may include a rigid or semi-rigid plastic funnel, for example.

As such, in use, when the trash receptacle 20 is emptied by inverting the trash receptacle 20, the scented granules 30 within the enclosure fall towards the top end 48 of the enclosure 40. The portion 35 of the granules 30 are segregated by the portion control structure 80 and delivered through the delivery conduit 110 to the discharge opening 60 traversing each conduit standoff 70 to be dispensed within the trash receptacle 20 upon uprighting of the trash receptacle 20.

In some embodiments, the dispenser 10 further includes at least one non-conduit standoff 120 fixed between the rear wall 46 of the enclosure 40 and the side wall 25 of the trash receptacle 20. In some embodiments, the bottom end 42 of the enclosure 40 further includes a drain opening 130 and a selectively removable drain cover 135 adapted for sealing the drain opening 130. As such, the scented granules 30 can be emptied from the enclosure 40 by removing the drain opening cover 135. The drain opening cover 135 may include threads on an outside surface thereof that are cooperative with threads on an inside surface of the drain opening 130. Alternately, the drain opening cover 135 may be held within the drain opening 130 by friction, or other suitable means as is known in the art.

Preferably the top end 48 of the enclosure 40 further includes a portion control volume adjustment mechanism 140 that, in a fully extended position 148 (FIG. 4), increases a volume within the enclosure 40 above the portion control structure 80, thereby maximizing the amount of the segregated portion 35 of the scented granules 30 delivered to the trash receptacle 20 with each inversion of the enclosure 40. In a fully retracted position 142 (FIG. 5), the portion control volume adjustment mechanism 140 decreases the volume within the enclosure 40 above the portion control structure 80, thereby minimizing the amount of the segregated portion 35 of the scented granules 30 delivered to the trash receptacle 20 with each inversion of the enclosure 40. The portion control volume adjustment mechanism 140 may include a threaded cap on a threaded protrusion, for example.

While a particular form of the invention has been illustrated and described, it will be apparent that various modifications can be made without departing from the spirit and scope of the invention. For example, the shape of the enclosure 40 may be altered from that shown in the figures. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A dispenser for dispensing scented granules into a trash receptacle having at least a side wall, comprising:
    an enclosure having at least a top end, a bottom end, a front wall, and a rear wall, the enclosure including a refill opening proximate the front wall and the top end, and at least one discharge opening in the rear wall, the enclosure adapted for holding the scented granules therein;
    a selectively removable refill cover adapted for sealing the refill opening;
    a conduit standoff projecting away from each discharge opening and adapted for fixing with the side wall of the trash receptacle, each conduit standoff being a conduit in fluid communication with the at least one discharge opening at a proximal end thereof and traversing the side wall of the trash receptacle at a distal end thereof;
    a portion control structure fixed inside the enclosure proximate the top end and cooperative therewith to segregate a portion of the scented granules contained in the enclosure when the enclosure is in an inverted orientation and to deliver the segregated scented granules through a delivery conduit to the at least one discharge opening when in an upright orientation;
    whereby when the trash receptacle is emptied by inverting the trash receptacle, the scented granules within the enclosure fall towards the top end of the enclosure, the portion of the granules being segregated by the portion control structure and delivered through the delivery conduit to the discharge opening traversing each conduit standoff to be dispensed within the trash receptacle.

2. The dispenser of claim 1 wherein the at least one discharge opening includes exactly two discharge openings, the dispenser including two conduit standoffs and two delivery conduits.

3. The dispenser of claim 1 further including at least one non-conduit standoff fixed between the rear wall of the enclosure and the side wall of the trash receptacle.

4. The dispenser of claim 1 wherein the bottom end of the enclosure further includes a drain opening and a selectively removable drain cover adapted for sealing the drain opening, whereby the scented granules can be emptied from the enclosure by removing the drain opening cover.

5. The dispenser of claim 1 wherein the top end of the enclosure further includes a portion control volume adjustment mechanism that in a fully extended position increases a volume within the enclosure above the portion control structure, maximizing the amount of the segregated portion of the scented granules delivered to the trash receptacle with each inversion of the enclosure, and that in a fully retracted position decreases the volume within the enclosure above the portion control structure, minimizing the amount of the segregated portion of the scented granules delivered to the trash receptacle with each inversion of the enclosure.

6. The dispenser of claim 1 wherein the portion control structure is fixed proximate the rear wall of the enclosure away from the refill opening.

7. The dispenser of claim 1 wherein the distal end of each standoff is threaded on an outside surface thereof, and wherein the standoffs are each fixed through an aperture formed through the side wall of the trash receptacle and fixed thereto with at least a pair of threaded nuts.

* * * * *